May 4, 1965  C. R. DOTSON ETAL  3,181,485
TABLE MOUNTED TRAY
Filed April 25, 1963
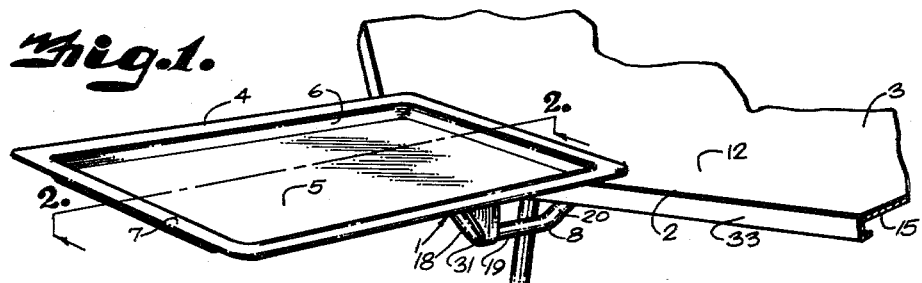
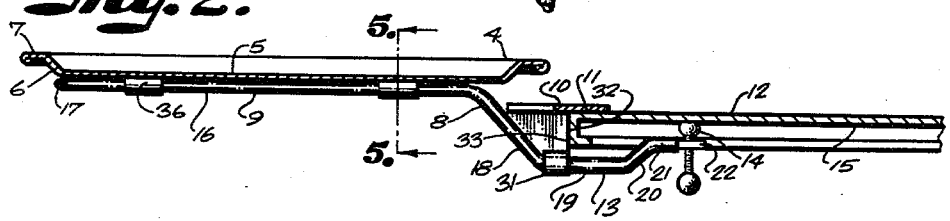
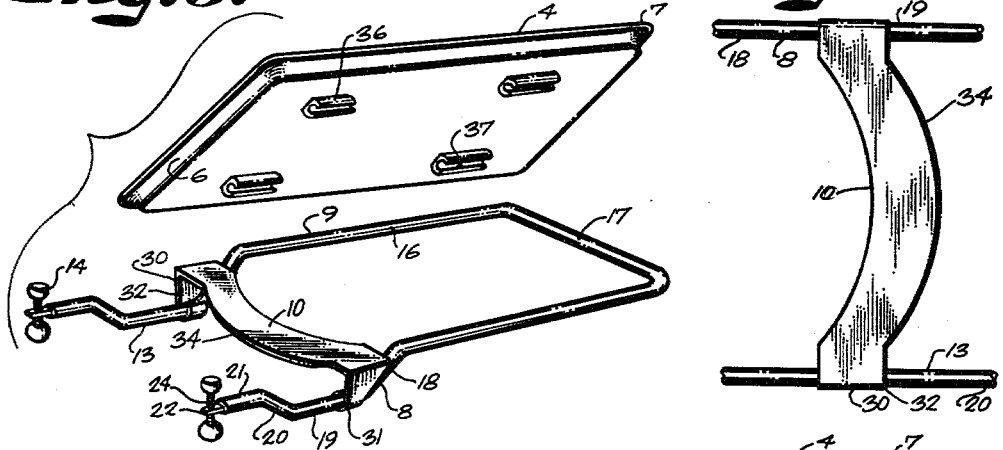
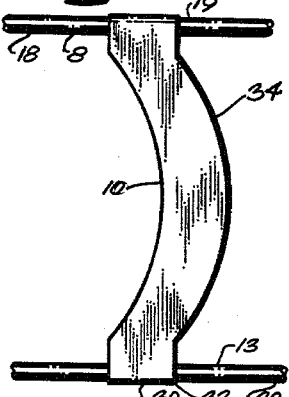
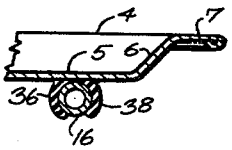
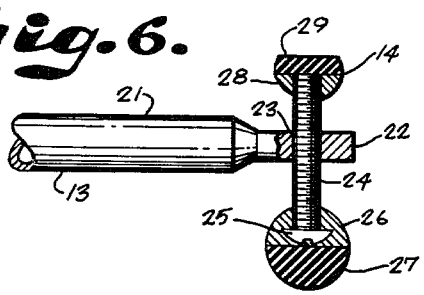
INVENTOR.
CLEAO R. DOTSON &
WILLIAM B. WILLIS
BY Fishburn and Gold
ATTORNEYS

3,181,485
TABLE MOUNTED TRAY
Cleao R. Dotson, 302 W. Newman, Harrison, Ark., and William B. Willis, Rte. 1, Everton, Ark.
Filed Apr. 25, 1963, Ser. No. 275,639
5 Claims. (Cl. 108—97)

This invention relates to article supports and the like, and more particularly to an article support mounting on a table, shelf or the like to form an extension thereof.

The principal objects of the present invention are to provide an article support structure adapted to be removably mounted on a table top, shelf or the like to extend laterally of an edge thereof; to provide an article support having a frame with a portion thereof having a flat undersurface overlying a marginal portion of a table top and spaced arms extending under and engaging the underside of the table top in spaced relation to the table edge with a portion of the frame extending laterally from said table; to provide such a structure with a tray or platform mounted on said extending frame portion with the weight of the frame extending outwardly from the table being greater than the portion extending inwardly thereof to maintain engagement of the arms with the underside of the table top; to provide such a structure wherein the arms include adjustable members engaging the table to level the tray; to provide a releasable connection of the tray with spaced frame members; and to provide such a structure that is economical to manufacture, is strong, durable and easily applied and removed to and from a table and the like.

Other objects and advantages of this invention will become apparent from the following description taken in connection with the accompanying drawings wherein are set forth by way of illustration and example certain embodiments of this invention.

FIG. 1 is a fragmentary perspective view of a table with an article support embodying the present invention mounted thereon.

FIG. 2 is a longitudinal sectional view through the article support and table taken on the line 2—2, FIG. 1.

FIG. 3 is a disassembled perspective view of the article support.

FIG. 4 is a partial plan view of the article support frame.

FIG. 5 is a transverse sectional view through the article support and frame taken on the line 5—5, FIG. 2.

FIG. 6 is a side elevational view of the frame arm and adjustable stop member with portions broken away to illustrate the structure thereof.

Referring more in detail to the drawings:

The reference numeral 1 generally designates an article support and mounting structure for removably connecting same to an edge portion 2 of a panel member 3 such as a table top, shelf or the like. The article support includes a platform member 4 on which articles may be positioned and which when mounted on a shelf or table top 3 extends laterally outwardly from the edge portion 2 to form an extension.

In the structure illustrated, the platform member is in the form of a tray having a bottom 5 with upwardly and outwardly inclined side and end walls 6 terminating in an outwardly extending flange 7. The platform or tray is mounted on an article support frame 8 which has a portion 9 under the tray, a flat extension or plate member 10 adapted to overlie a marginal portion 11 of the upper surface 12 of a table top or shelf 3. The frame 8 includes spaced arms 13 which extend under the table top or shelf and has abutment members 14 mounted thereon adapted to engage an undersurface 15 of the table top or shelf 3 in inwardly spaced relation to the plate member 10. The part of the frame that extends laterally outwardly from the table or shelf is preferably of greater weight than the portion under the table top whereby the engagement of the plate portion 10 and the abutment members 14 with the table top is maintained until the frame member is manually moved to effect disengagement for disconnection or removal of the frame from the table top or shelf.

In the structure illustrated, the frame is preferably arranged whereby the portion 9 and the arms 13 are formed from a single rod or tube bent to the desired shape. The portion 9 is generally U-shaped with spaced parallel legs 16 connected at one end by a bar portion 17 and with the other ends of the legs having downwardly inclined portions 18 that slope in a direction opposite from the bar 17. The arms 13 extend from the lower ends of the inclined portions 18 and include parallel portions 19 preferably having the same spacing as the legs 16 and in a plane spaced below the plane of the legs 16. The arms have portions 20 and 21 that form extensions from the portions 19, the portions 20 being inclined upwardly and terminating in horizontal portions 21. The free ends of the portions 21 have flattened end members 22 that carry the abutments 14. In the structure illustrated, the end members 22 have threaded apertures 23 and the abutments 14 are on adjusting screws 24 screwed into and extending through the apertures 23. In the structure illustrated, the adjusting screw abutment members have heads 25 enclosed in members 26 which have a resilient cushion member 27 suitably secured as by adhesive to the outer end thereof. On the free end of each of the screws 24, a form of nut 28 is screwed thereon, said nut having a resilient cushion member 29 adhered thereto whereby the nut can be removed from the screw and the screw removed from the threaded aperture 23 and turned around and threaded into said aperture in the opposite direction whereby the cushion member 27 or the cushion member 29 may be selectively arranged at suitable spacing above the end member 22 to engage the underface 15 of the table top or shelf.

The frame 8 includes a plate or transverse member 10 which, in the illustrated structure, extends transversely of the frame member and has downturned side portions 30 with the lower ends preferably rolled around and suitably secured to the arm portions 19 as at 31 whereby the plate member is rigidly secured relative to said arms. It is preferred that the rear portion of the plate member 10 at the sides engage the inclined leg portions 18 to further add to the rigidity of the structure. The edges 32 of the sides 30 of the plate member, that is the edges toward the abutments 14, are adapted to engage the edge 33 of a table top or shelf with a portion of the plate member between the arms 19 extending over the top surface 12 of the table top. In the structure illustrated, the central portion of the plate member is arcuate as at 34 to form a flat extension or portion that overlies the table top.

It is preferred that the tray or platform 4 be removably mounted on the frame. In the structure illustrated, there are resilient channel-like members 36 suitably secured in spaced relation on the underside of the bottom 5 of the tray, said channel members each having a downwardly opening slot 37 to define spaced legs 38 normally having a spacing less than the width of the legs 16 of the frame whereby when the respective channel members are moved to insert the leg members through the slots 37 the channel members form a gripping engagement with said leg members to securely hold the tray thereon. In the structure illustrated, there are two channel members for each leg and said channel members are spaced from the bar portion 17 and the from the downwardly inclined portion 18 with the channel members slidably engaged with the legs 16 to permit movement of the tray longitudinally of the frame. Said movement is limited in extent but does provide some selective positioning of the tray relative to the side edge 33 of the table top or shelf.

In using an article support constructed and assembled as described, with the tray on the frame, the arms 13 are inserted under a marginal portion of a table top or shelf 3 and then the frame and tray are raised until the plate portion 10 can be moved into overlying position with the top surface 12 of the table top or shelf. In this position, the abutment 14 should engage the undersurface 15 in such a manner as to cooperate with the plate portion and hold the structure whereby the bottom 5 of the tray is horizontal. If it is not horizontal, the adjusting screw is moved to vary the spacing between the end members 22 and the bottom surface 15 of the table until the tray is horizontal. This adjustment provides for some variation in thickness of a table top. However, the shape of the cushion members 29 and 27 is such that by reversing the adjusting screws in the end portions 22 the structure can be made to accommodate additional variations in thicknesses of the table top or the shelf. The engagement of the abutment 14 with the undersurface 15 of the table top or shelf is spaced inwardly from the location of the engagement of the plate portion 10 with the upper surface 12 of said table top or shelf so that the weight of the laterally extending portion of the frame and the tray and any article thereon is resisted by the cooperative relationship and engagement of the table top or shelf by the plate portion 10, edges 32 and abutments 14. This structure is such that the tray or article support may be positioned at the corner of a table, along straight sides thereof or other contours of the edge portion of a table or shelf whereby the article support forms an extension therefrom to receive articles for use or display.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. In an article holding attachment for tables and the like comprising, a U-shaped frame having spaced parallel leg members adapted to be positioned in a horizontal plane and connected by a transverse bar member at one end thereof, said leg members having downwardly inclined portions extending from the other ends thereof, spaced parallel arms extending from said inclined portions in a plane spaced from and substantially parallel to the plane of said parallel frame leg members, a transverse member connecting said spaced arms adjacent said inclined portions and having edge portions normal to said arms and adapted to engage an edge of a tabel top with said arms disposed under said table top, a flat portion on said transverse member between said edge portions thereof and extending relative thereto in upwardly spaced relation to said arms for overlying a marginal portion of an upper surface of the table top when said edge portions engage the edge of the table top, abutment means adjustably mounted adjacent free ends of said arms and adapted to engage an undersurface of said table top to cooperate with the engagement of the flat portion of the transverse member with the table top to support the frame with said leg portions thereof extending laterally therefrom, a tray extending between and connecting said frame member legs in overlying relation thereto, and means for releasably connecting said tray to said frame leg members.

2. An article holding attachment for tables and the like as set forth in claim 1 wherein said abutment means are adjustably mounted on said arms and have cushion members engaging said underside of the table top, said abutment means being operable to move the arms up and down relative to said table top and cooperate with the flat portion of the transverse member in positioning the tray horizontal.

3. In an article holding attachment for tables and the like comprising, a frame, an article holding platform mounted on said frame and having an upper surface adapted to be positioned horizontally to receive articles thereon, laterally spaced downwardly extending leg portions at one end of said frame, spaced arms on said leg portions, a transverse plate member on said frame at said one end thereof extending between said leg portions and secured to said arms, said plate member having spaced edges to engage an edge of a table top, said plate member having a flat extension between said edges thereof for overlying a marginal portion of an upper surface of the table top adjacent said table top edge, said spaced arms extending from said leg portions in downwardly spaced relation to said flat extension of the transverse plate member, and abutment members adjustably mounted on said arms spaced from the edge portions of said transverse plate member for engaging an undersurface of a table top in inwardly spaced relation to said flat extension and operable to move the arms up and down and cooperate with said flat extension in holding the article holding platform horizontal.

4. An article holding attachment for tables and the like as set forth in claim 5 wherein the tray includes depending channel members resiliently engaging said spaced leg member of the frame to removably mount the tray thereon.

5. In an article holding attachment for tables and the like comprising, a frame having spaced parallel leg members, said leg members having downwardly inclined portions extending from the one end thereof, spaced parallel arms extending from said inclined portions in a plane spaced below the plane of said parallel frame leg members, a transverse plate member connecting said spaced arms adjacent said inclined portions, means associated with said transverse plate member for engaging an edge of a table top with said arms disposed under said table top, a flat portion on said transverse plate member spaced above said arms and extending in overlying engagement with a marginal portion of an upper surface of a table top adjacent said table top edge, abutment means adjustably mounted adjacent free ends of said arms and adapted to engage an undersurface of said table top to cooperate with the engagement of the transverse plate member with the table top to support the frame with said leg portions thereof extending laterally therefrom, and a tray extending between and connecting said frame member legs in overlying relation thereto.

References Cited in the file of this patent

UNITED STATES PATENTS

| 1,223,637 | 4/17 | Swain | 108—97 |
| 1,343,699 | 6/20 | Wilson | 108—152 |
| 1,578,136 | 3/26 | Kane | 108—97 |
| 1,779,342 | 10/30 | Strom et al. | 108—97 |
| 1,911,959 | 5/33 | Kern et al. | 108—97 |
| 2,002,328 | 5/35 | Mitchell | 108—152 |
| 2,709,563 | 5/55 | Starkey | 108—97 |
| 2,710,643 | 6/55 | Wincey et al. | 297—174 |
| 2,963,761 | 12/60 | Haydock | 297—153 |

FOREIGN PATENTS

| 1,052,650 | 3/59 | Germany. |

FRANK B. SHERRY, *Primary Examiner.*